United States Patent
Broillet et al.

(10) Patent No.: US 6,386,040 B1
(45) Date of Patent: May 14, 2002

(54) METHOD AND SYSTEM FOR COMBINED VIBRATION MEASUREMENTS

(75) Inventors: Bernard Broillet, Misery; José Denis Monot, Bulle; Luc Yves Louis Fromaigeat, Fribourg, all of (CH)

(73) Assignee: Vibro-Meter SA (CH)

( * ) Notice: Subject to any disclaimer, the term of this patent is extended or adjusted under 35 U.S.C. 154(b) by 0 days.

(21) Appl. No.: 09/535,524

(22) Filed: Mar. 24, 2000

(30) Foreign Application Priority Data

May 19, 1999 (EP) .............................................. 99810438

(51) Int. Cl.[7] .......................... G01M 7/00; G01M 13/04
(52) U.S. Cl. ............................................ 73/593; 73/584
(58) Field of Search .......................... 73/584, 587, 588, 73/589, 593, 594, 590, 602, 658, 660, 462, 579

(56) References Cited

U.S. PATENT DOCUMENTS

| | | | |
|---|---|---|---|
| 3,757,565 A | | 9/1973 | Wong ........................ 73/71.4 |
| 4,063,450 A | | 12/1977 | Lyons ........................ 73/579 |
| 4,317,105 A | * | 2/1982 | Sinha et al. ................. 73/593 |
| 4,437,163 A | * | 3/1984 | Kurihara et al. .............. 73/593 |
| 4,598,588 A | * | 7/1986 | Hanson ...................... 73/594 |
| 4,738,138 A | * | 4/1988 | Redman-White ............ 73/594 |
| 4,784,237 A | * | 11/1988 | Condne et al. ............... 73/493 |
| 4,935,748 A | * | 6/1990 | Schmidt et al. ............... 367/37 |
| 5,005,415 A | * | 4/1991 | Holroyd ....................... 73/587 |
| 5,445,028 A | * | 8/1995 | Bianchi et al. ............... 73/593 |

FOREIGN PATENT DOCUMENTS

| | | |
|---|---|---|
| GB | 2054852 | 2/1981 |
| WO | 87/05570 | 9/1987 |

* cited by examiner

*Primary Examiner*—Helen Kwok
(74) *Attorney, Agent, or Firm*—Ostrolenk, Faber, Gerb & Soffen, LLP (57) ABSTRACT

A method and a system for measuring the mechanical vibrations of an object. In order to simplify the electronic circuit necessary for the measurement chain and to reduce its costs, this method and this system are characterized in that they comprise the processing of an input signal, representative of an acceleration or of a velocity related to a mechanical vibration of said object, said input signal having a frequency spectrum comprising a so-called low frequency band, situated below a so-called transition frequency, and a so-called high frequency band, situated above said transition frequency, said method and system carrying out said processing of said input signal by means of an electronic circuit for producing an output signal which, in said low frequency band, corresponds to the mathematical integral over the time of said input signal, and, in said high frequency band, corresponds to said input signal.

18 Claims, 8 Drawing Sheets

METHOD AND SYSTEM FOR COMBINED VIBRATION MEASUREMENTS

BACKGROUND OF THE INVENTION

1. Field of the Invention

The present invention is related to a method for measuring mechanical vibrations of an object. Furthermore, the invention is related to a system for measuring such vibrations of an object.

2. Description of the Prior Art

The frequency spectrum of a signal representative of the vibrations of, e.g., an axial compressor or any other rotational industrial or aeronautical machine shows generally two rather different domains:

1) At low frequencies, for example in a frequency range lower than 1000 or 2000 Hertz, the vibration signal has a rather low level in terms of acceleration and is for example inferior to 1 m/s$^2$.

In the fields of aeronautics and industry, a low frequency vibration signal is transformed or measured in terms of vibration velocity which is representative of the vibration energy, often destructive, which acts on a rotary machine.

The ranges of low frequencies and the levels of acceptable vibration signals in these ranges are broadly standardized in function of the machine, for example:

according to ISO standard No. 2954/VDI2056, between 10 and 1000 Hertz;

according to API standard No. 670, between 10 and 2500 Hertz, etc.

At low frequencies, the level of a vibration signal at the fundamental rotational frequency constitutes a particular interest in counterbalancing principal rotors (for example in the case of a blower, a compressor and a turbine, a propeller, etc.). The level of the vibration signal at harmonics at low frequencies has also a certain interest in certain analyses.

2) At medium and high frequencies (for example at frequencies higher than 1000 Hertz), lines corresponding for example to gearing vibrations, to multiples and modulation of such lines, lines corresponding to the passage of turbine blades, to signatures of rolling bearings, etc., can be found in the frequency spectrum of a signal representative of the vibrations of an object.

In the field of industry, a vibration signal of medium and high frequencies is measured in terms of the vibration acceleration, and its level is relatively high and often greater than to 10 m/s$^2$.

In the fields of civil and, above all, military aeronautics, the vibration acceleration at high frequencies may attain 10,000 m/s$^2$; such vibrations can provoke saturation of the first amplification stage in the measurement chain.

The above-indicated strongly pronounced differences between the features of a low frequency vibration signal and the features of the same signal at medium and high frequencies result in the necessity, for certain applications as, for example, the measurement of vibrations acting upon a turbo-propeller group of an aircraft, to install two different measurement chains, namely a first measurement chain for monitoring the low frequency component of the vibrating signal corresponding to the vibrations related to the rotation of the propeller, and a second measurement chain for monitoring, in the field of high frequencies, the component of the vibrating signal corresponding to the vibrations of the reduction gear. Such a solution has certain disadvantages, namely not only the price increase of the measurement system but also a lower reliability of such a system, since it is more complex and, as a consequence, the probability of defects is higher.

SUMMARY OF THE INVENTION

Therefore, the aim of the present invention is to provide a method and a system for measuring mechanical vibrations which allows to overcome the above-discussed drawbacks.

According to a first aspect of the invention this aim is attained with a method for measuring the mechanical vibrations of an object, comprising electronically processing an input signal, representative of an acceleration related to a mechanical vibration of said object and having a frequency spectrum comprising a low-frequency band situated below a transition frequency and a high frequency band situated above said transition frequency, said processing being carried out by means of an electronic circuit which is adapted to provide an output signal which within said low-frequency band corresponds to the mathematical integral over the time of said input signal, i.e. to the vibration velocity of said object, and within said high-frequency band corresponds to the input signal, i.e. to the vibration acceleration of said object.

According to a second aspect of the invention, the above mentioned aim is attained with a method for measuring the mechanical vibrations of an object, comprising electronically processing an input signal, representative of a velocity related to a mechanical vibration of said object and having a frequency spectrum comprising a low-frequency band situated below a transition frequency and a high frequency band situated above said transition frequency, said processing being carried out by means of an electronic circuit which is adapted to provide an output signal which within said low-frequency band corresponds to the mathematical integral over the time of said input signal, i.e. to the vibration displacement of said object, and within said high-frequency band corresponds to the input signal, i.e. to the vibration velocity of said object.

According to a third aspect of the invention, the above mentioned aim is attained with a system for measuring mechanical vibrations of an object, comprising (a) a transducer mounted on said object and being capable of providing at its output an input signal which is representative of an acceleration related to a mechanical vibration of said object, said input signal comprising a low-frequency band situated below a transition frequency and a high frequency band situated above said transition frequency, and (b) an electronic circuit having an input port, connected to the output of said transducer, and an output port, said circuit being adapted to process said input signal to yield an output signal which within said low-frequency band corresponds to the mathematical integral over the time of said input signal, and which within said high-frequency band corresponds to said input signal.

According to a fourth aspect of the invention, the above mentioned aim is attained with a system for measuring mechanical vibrations of an object, comprising (a) a transducer mounted on said object and being capable of providing at its output an input signal which is representative of a velocity related to a mechanical vibration of said object, said input signal comprising a low-frequency band situated below a transition frequency and a high frequency band situated above said transition frequency, and (b) an electronic circuit having an input port, connected to the output of said transducer, and an output port, said circuit being adapted to process said input signal to yield an output signal which within said low-frequency band corresponds to the mathematical integral over the time of said input signal, and which within said high-frequency band corresponds to said input signal.

The main advantage of the invention is that it allows to obtain, by means of a sole transducer and a sole measurement chain, a single output signal which, in the range of low frequencies, corresponds to the vibration velocity, and in the range of medium and high frequencies, to the vibration acceleration. The information thus obtained on the vibration velocity may be used to quantify the severity of vibrations at low frequencies and to take the necessary measures for the protection of the machine, whereas the information obtained on the vibration acceleration may be used above all for the diagnostic and the health of mechanical components such as bearings, blade arrays and gearings which generate in particular the high frequency vibrations when their mechanical condition degrades.

Furthermore, the invention offers the following advantage:

It permits either to increase the level of the signal at low frequencies where the problem of background noise often limits the behavior of the measurement chains, or to decrease the amplitudes at high frequencies which could provoke the saturation in the following stages of the measurement chain. In both cases, this advantage provides an optimization of the signal dynamics. In a simple example of an industrial turbo-generator, it has been calculated that the necessary dynamic was optimized by about 30 dB. This great improvement reduces the performance requirements downstream the collecting chains and allows for example to simplify the attenuators or amplifiers at the input port of the signal processing unit, and to reduce the resolution performance of the analog-digital converters (ADC) in terms of required bits.

The invention thus allows to reach simultaneously two goals, namely, on one hand, an improvement of the dynamics in the processing of the measurement signal, and, on the other hand, the supply of two physical quantities of current use in vibration analysis, namely acceleration and velocity, and this on a single output signal stemming from a sole transducer.

Still another advantage of the invention is the fact that it allows to increase the productivity of measurements which can be carried out by means of a system for measuring mechanical vibrations. In fact, for dynamic reasons during the signal processing, it has been necessary until now to carry out two separated analyses: one within the range of low frequencies, and the other in the range of medium and high frequencies. Each one of these analyses consists in a type FFT (Fast Fourier Transformation) processing which is a long-lasting one for the operators and the processor. Since the present invention allows to modify or adapt the signal dynamics, the analysis of the measurement signal can be carried out in a single run, resulting in a gain of time and in a simplification in the management of the vibration database.

It is possible, through a repeated application of the method according to the invention, to obtain a single output signal carrying information on three physical quantities such as displacement, velocity and acceleration. The applications of this variant are, however, more limited.

Embodiments of the invention will now be described by way of Examples in referring to the attached drawings.

DETAILED DESCRIPTION OF THE INVENTION

Examples of a First System and of a First Method According to the Invention

Figure 1:
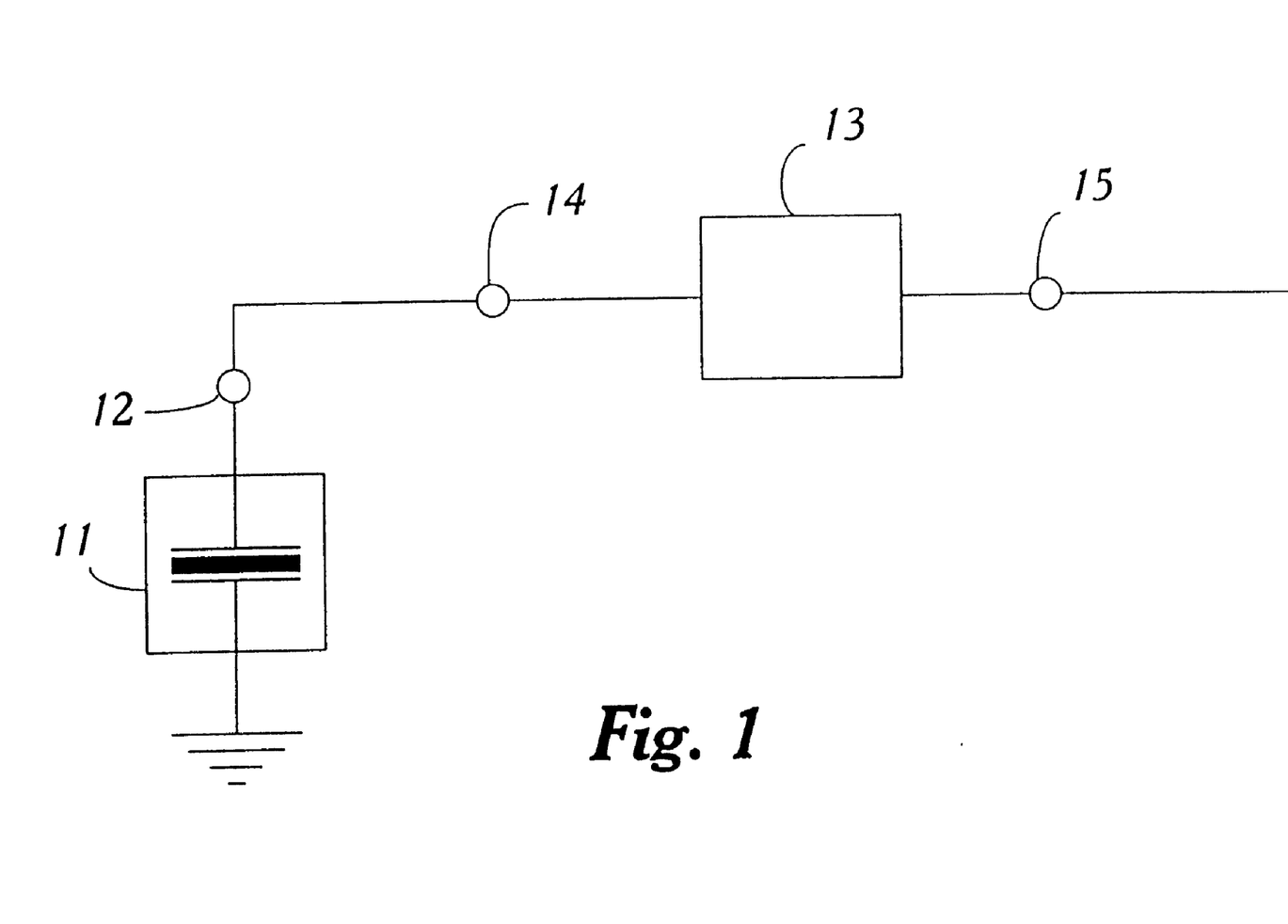
FIG. 1 shows the block diagram of a first system according to the invention.

As it has been shown in the block diagram of FIG. 1, a first system according to the invention for the measurement of mechanical vibrations of an object comprises a transducer 11 which is mounted on an object subjected to vibrations, and an electronic circuit 13.

The transducer 11 has an output port 12 on which it supplies a signal representative of the acceleration of the vibration movement of the object. This signal has a frequency spectrum comprising a band called low frequency band situated below a frequency called transition frequency, and a second band called high frequency band, situated above said transition frequency.

The electronic circuit 13 has an input port 14, connected to the output port 12 of the transducer 11, and an output port 15. The circuit 13 is used to process the signal supplied by the transducer 11 at its output port 12. The circuit 13 supplies an output signal at its output port 15 which, in said low frequency band, corresponds to the mathematical integral over the time function of the output signal of the transducer 11, and within said high frequency band, corresponds to said output signal of the transducer 11. The output signal supplied at the output port 15 of the electronic circuit 13 is therefore composed in such a manner that, within said low frequency band, it corresponds to the velocity of the vibration movement of the object, and within said high frequency band, it corresponds to the acceleration of the vibration movement of the object.

The measurement system according to FIG. 1 thus allows the implementation of a first method according to the invention, characterized in that it comprises:

the processing of an input signal, representative of an acceleration related to a mechanical vibration of the examined object, said input signal having a frequency spectrum comprising a so-called low-frequency band situated below a transition frequency, and a so-called high frequency band situated above said transition frequency, said method carrying out said signal processing in an electronic circuit for producing an output signal such as the signal supplied at the output port 15 of the electronic circuit 13, said output signal corresponding, within said low-frequency band, to the mathematical integral over the time of said input signal, i.e. to the vibration velocity of said object, and corresponding, within said high-frequency band, to the input signal, i.e. to the vibration acceleration of said object.

First Example of a System According to FIG. 1

Figure 2:
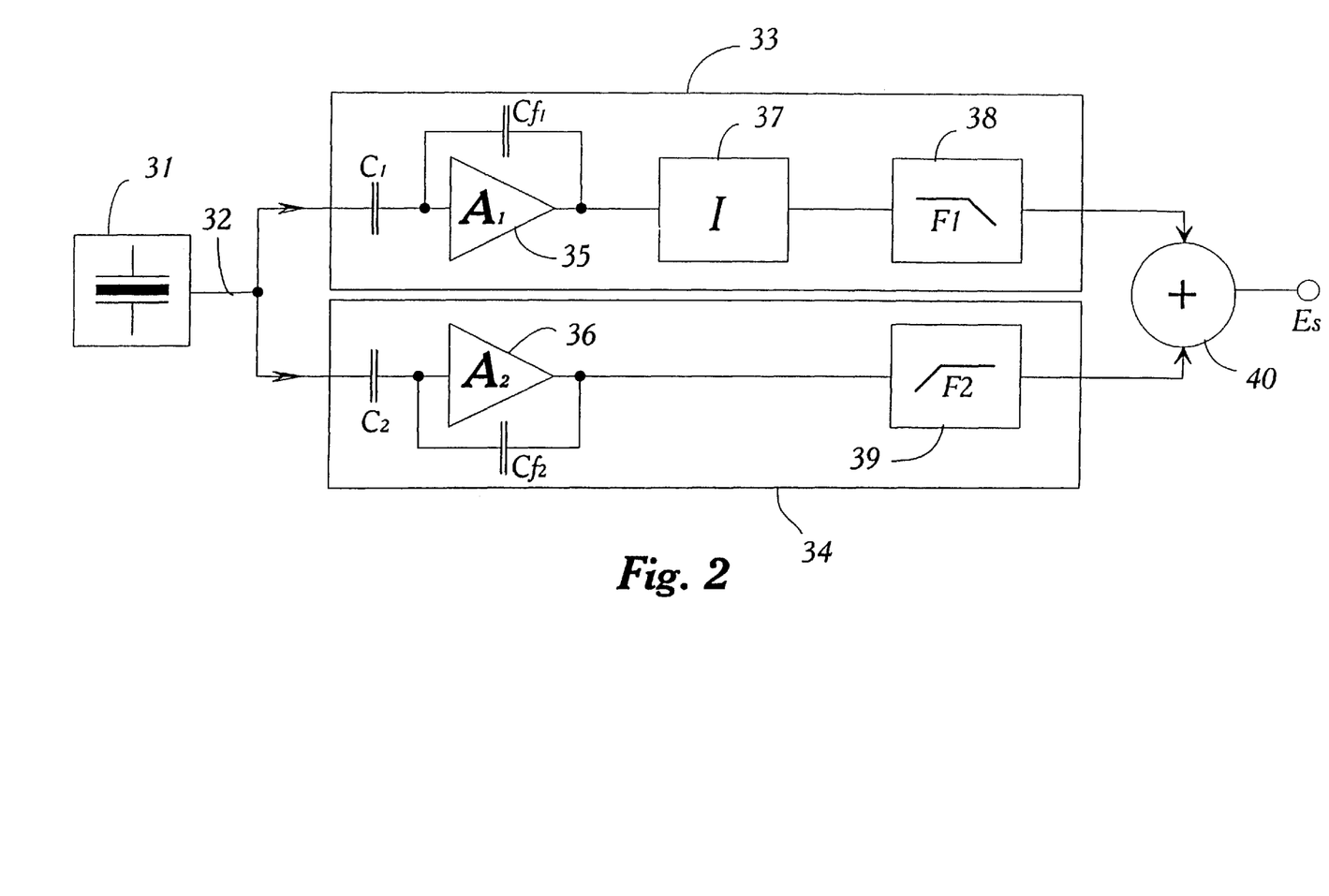
FIG. 2 shows a block diagram of a first embodiment of a system whose block diagram is shown in FIG. 1.

FIG. 2 shows the block diagram of a first example of a measurement system whose block diagram is shown in FIG. 1. The system represented in FIG. 2 comprises a transducer 31 mounted on an object which is subjected to vibrations (this object is not shown in FIG. 2), and an electronic circuit 33 for the processing of the output signal supplied by the transducer 31.

The transducer 31 is arranged as an accelerometer and supplies an electric charge Q as an output signal on line 32. This charge Q is proportional to the acceleration of the object over the entire interesting frequency range.

The electronic circuit for processing the output signal, supplied by the transducer 31 on line 32, comprises two branches 33, 34. Each one of these branches contains a charge divider $C_1$ and, respectively, $C_2$ allowing to optimize the distribution of the signal dynamic, followed by a charge amplifier 35 and 33, respectively. Negative feedback capacitors $Cf_1$ and $Cf_2$, respectively, allow to control the gain of charge amplifiers 35 and 36, respectively. The frequency bands transmitted by these amplifiers can be limited. In the first branch 33, the amplifier 35 is followed by an integrator 37 which transforms the signal corresponding to acceleration, supplied at the output of amplifier 35, to a signal corresponding to velocity. The integrator 37 is followed by a low-pass filter 38 whose passing band extends from $f_0$ to $f_1$ where f0 is the lowest frequency of interest and $f_1$ is the so-called transition frequency. In the second branch 34, the amplifier 36 is directly followed by a high-pass filter 39 whose passing band extends from $f_1$ to $f_2$ where $f_2$ is the highest frequency of interest. The output signals of the two branches 33 and 34 are applied to the inputs of a summing integrator 40 that supplies an output signal $E_s$ whose mathematical expression is:

$E_s = dx/dt = x'$ in the interval $[f_0;f_1]$ $E_s = d^2x/dt^2 = x''$ in the interval $[f_1;f_2]$ thus:

$E_s = (x'[f_0;f_1]) \oplus (x''[f_1;f_2])$

The variable x represents the vibration displacement.

Second Example of a System According to FIG. 1

Figure 3:
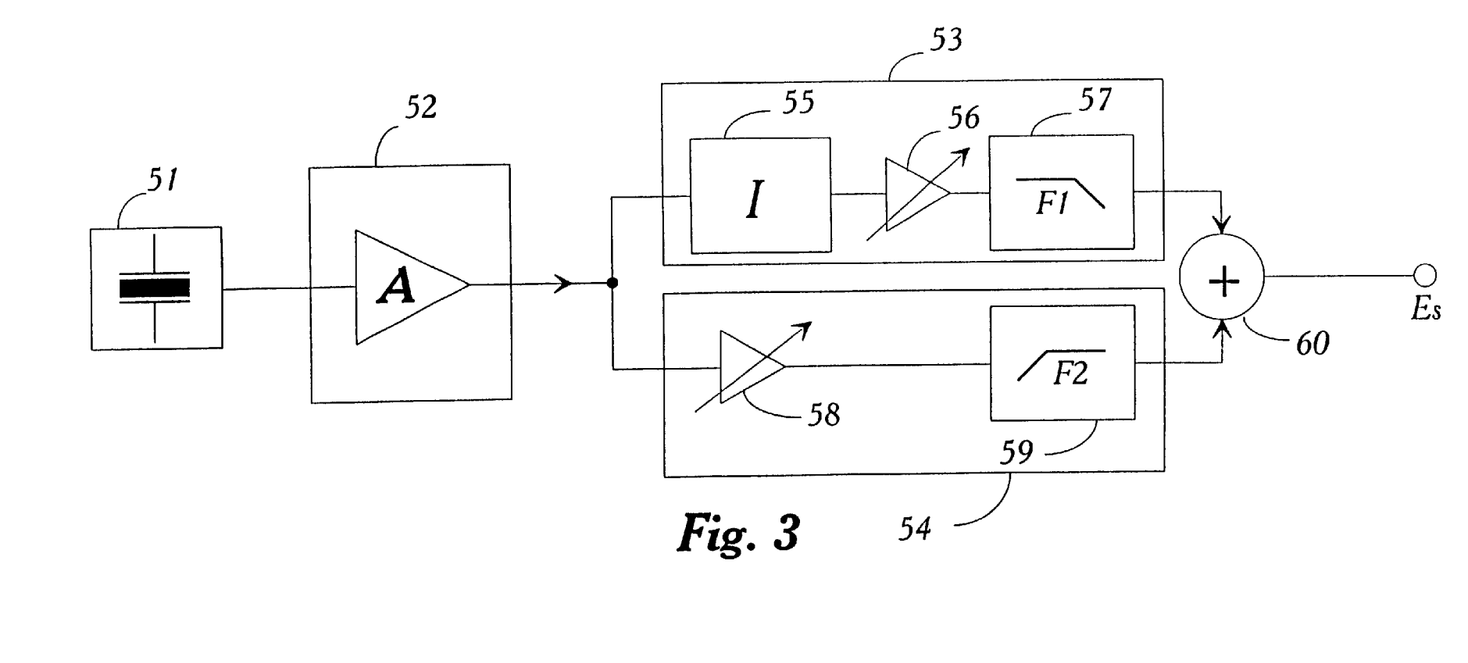
FIG. 3 shows a block diagram of a second embodiment of a system whose block diagram is shown in FIG. 1.

FIG. 3 shows the block diagram of a second example of a measurement system whose block diagram is shown in FIG. 1. The system represented in FIG. 3 comprises a transducer 51 mounted on an object which is subjected to vibrations (this object is not shown in FIG. 3), and an electronic circuit for the processing of the output signal supplied by the transducer 51.

The transducer 51 is arranged as an accelerometer and supplies an electric charge Q as an output signal, the charge Q being proportional to the acceleration of the object over the entire interesting frequency range.

The transducer 51 is followed by a charge amplifier 52 having a dynamic that is adapted to the entire range of useful frequencies. The charge amplifier 52 is followed by two branches 53, 54 for the processing of its output signal which corresponds to the acceleration of the object.

The branch 53 comprises an integrator 55 that transforms the signal supplied at the output of amplifier 52 and corresponding to acceleration, into a signal corresponding to velocity. The integrator 55 is followed by an adjustable gain amplifier 56 and then by a low-pass filter 57 whose passing band extends from $f_0$ to $f_1$.

The branch 54 comprises an adjustable gain amplifier 58 followed by a high-pass filter 59 whose passing band extends from $f_1$ to $f_2$.

The adjustable gain amplifiers 56 and 58 permit to control the two sensibilities of velocity and acceleration.

The output signals of the two branches 53 and 54 are applied to the inputs of a summing integrator 60 that supplies an output signal $E_s$ whose mathematical expression is the same as that in the preceding Example related to FIG. 2:

$E_s = dx/dt = x'$ in the interval $[f_0;f_1]$ $E_s = d^2x/dt^2 = x''$ in the interval $[f_1;f_2]$ thus:

$E_s = (x'[f_0;f_1]) \oplus (x''[f_1;f_2])$

The variable x represents the vibration displacement.

Third Example of a System According to FIG. 1

Figure 4:
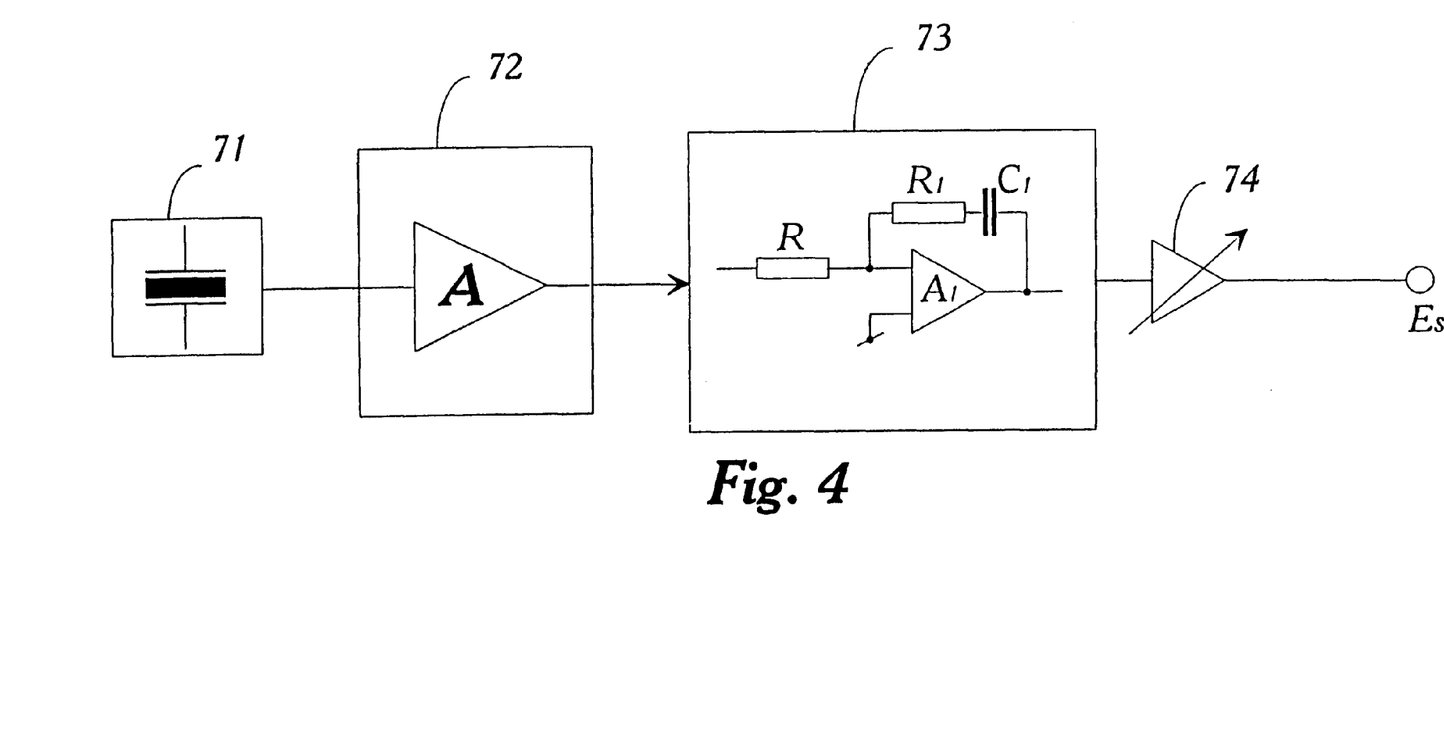
FIG. 4 shows a block diagram of a third embodiment of a system whose block diagram is shown in FIG. 1.

FIG. 4 shows the block diagram of a third example of a measurement system whose block diagram is shown in FIG. 1. The system represented in FIG. 4 comprises a transducer 71 mounted on an object which is subjected to vibrations (this object is not shown in FIG. 4), and an electronic circuit 73 for the processing of the output signal supplied by the transducer 71.

The transducer 71 is arranged as an accelerometer and supplies an electric charge Q as an output signal, the charge Q being proportional to the acceleration of the object over the entire interesting frequency range.

The transducer 71 is followed by a charge amplifier 72 having a dynamic that is adapted to the entire range of useful frequencies. The charge amplifier 72 is followed by a circuit 73 for the processing of its output signal which corresponds to the acceleration of the object. The circuit 73 is in turn followed by an adjustable gain amplifier 74.

The circuit 73 is a limited I/P integrator having the structure shown in FIG. 4. In the circuit 73, the output signal supplied by the amplifier 72 is subjected, as to the electronic meaning, to a so-called "limited" I/P integration. The term "limited" integration is justified by the fact that the I/P circuit acts as a mathematical integrator in the range of low frequencies until the so-called transition frequency $f_1$, in which field the impedance of the feedback of the amplifier that is part of the I/P integrator, is essentially capacitive and becomes resistive for the range of high frequencies. The transition frequency $f_1$ responds to the relation $f_1 = 1/2\pi R_1 C_1$.

The output signal supplied by the circuit 73 is amplified in the adjustable gain amplifier 74.

The adjustable gain amplifier 74 supplies an output signal $E_s$ whose mathematical expression is the same as that in the preceding Examples described with regard to FIGS. 2 and 3:

$E_s = dx/dt = x'$ in the interval $[f_0; f_1]$ $E_s = d^2x/dt^2 = x''$ in the interval $[f_1; f_2]$ thus:

$E_s = (x'[f_0; f_1]) \oplus (x''[f_1; f_2])$

The variable x represents the vibration displacement.

In the present Example, the output signal $E_s$ fulfills the function $E_s = (x'[f_0; f_1]) \oplus (x''[f_1; f_2])$ precisely at the asymptotes, namely near the frequencies $f_0$ and $f_2$ and with a certain error around the transition frequency $f_1$.

Examples of a Second System and a Second Method According to the Invention

Figure 5:
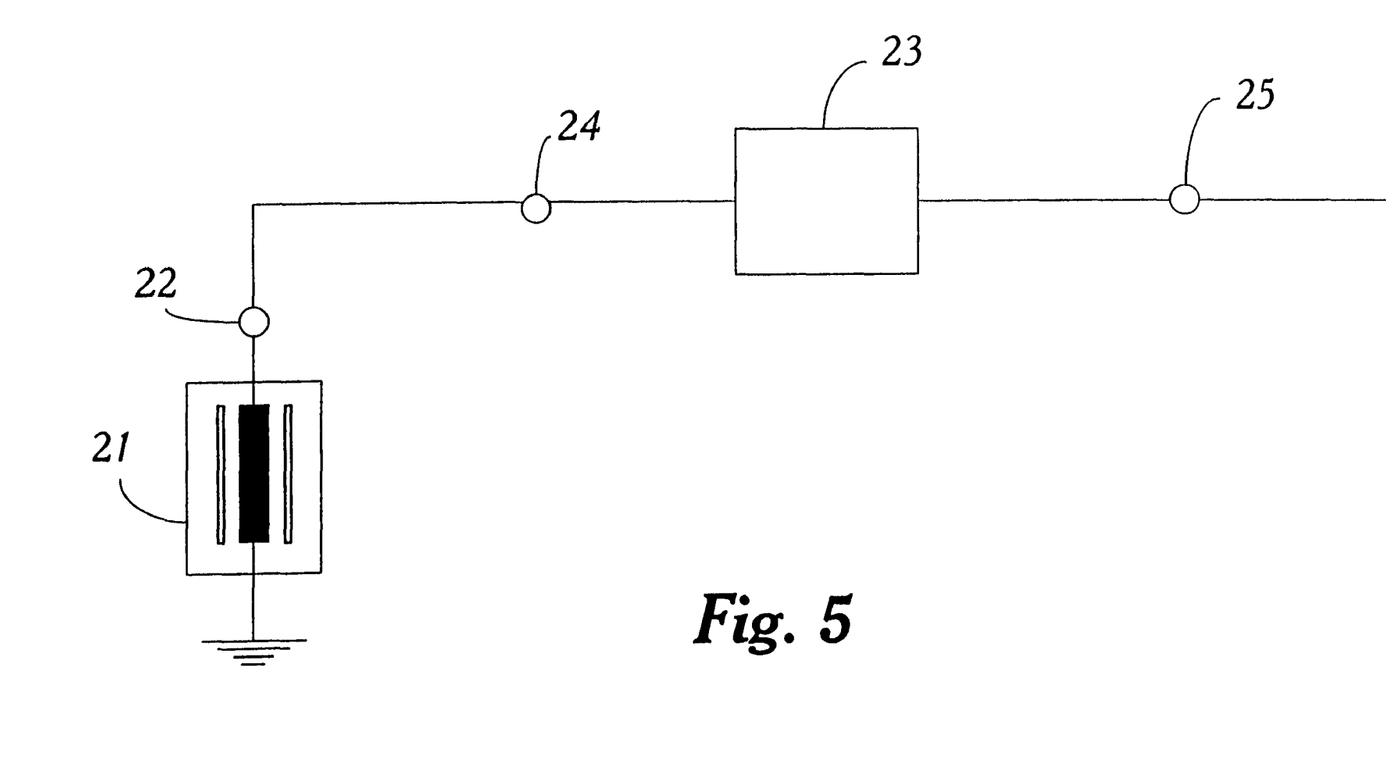
FIG. 5 shows a block diagram of a second system according to the invention.

As it is represented in the block diagram of FIG. 5, a second system according to the invention for the measurement of mechanical vibrations of an object comprises a transducer 21 which is mounted on an object subjected to vibrations, and an electronic circuit 23.

The transducer 21 has an output port 22 on which it supplies a signal representative of the velocity of the vibration movement of the object. This signal comprises a frequency spectrum comprising a band called low frequency band situated below a frequency called transition frequency, and a second band called high frequency band, situated above said transition frequency.

The electronic circuit 23 has an input port 24, connected to the output port 22 of the transducer 21, and an output port 25. The circuit 23 is used to process the signal supplied by the transducer 21 at its output port 22. The circuit 23 supplies an output signal at its output port 25 which, in said low frequency band, corresponds to the mathematical integral over the time function of the output signal of the transducer 21, and within said high frequency band, corresponds to said output signal of the transducer 21. The output signal supplied at the output port 25 of the electronic circuit 23 is therefore composed in such a manner that, within said low frequency band, it corresponds to the displacement associated to the vibration movement of the object, and within said high frequency band, it corresponds to the velocity of the vibration movement of the object.

The measurement system according to FIG. 5 thus allows the implementation of a second method according to the invention, characterized in that it comprises:

the processing of an input signal, representative of a velocity related to a mechanical vibration of the examined object, said input signal having a frequency spectrum comprising a so-called low-frequency band situated below a transition frequency, and a so-called high frequency band situated above said transition frequency, said method carrying out said signal processing in an electronic circuit for producing an output signal such as the signal supplied at the output port 25 of the electronic circuit 23, said output signal corresponding, within said low-frequency band, to the mathematical integral over the time of said input signal, i.e. to the vibration displacement of said object, and corresponding, within said high-frequency band, to the input signal, i.e. to the vibration velocity of said object.

First Example of a System According to FIG. 5

Figure 6:
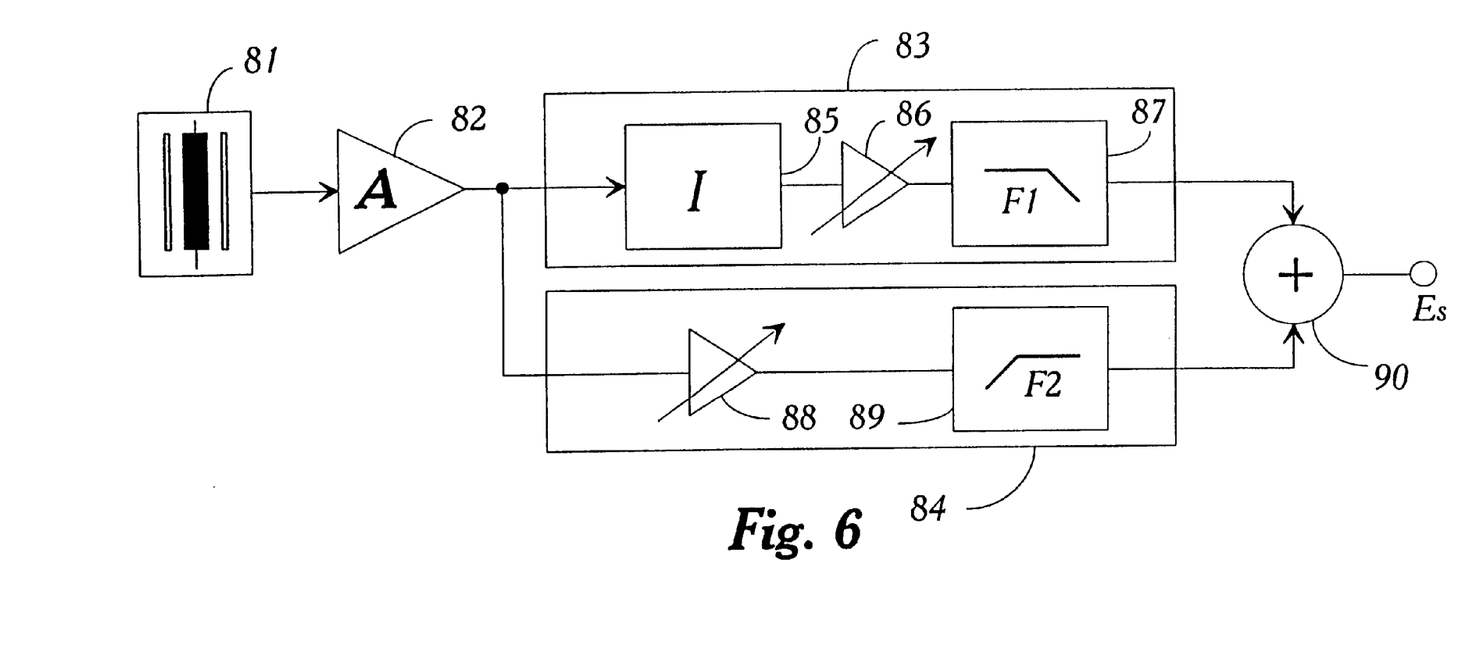
FIG. 6 shows a block diagram of a first embodiment of a system whose block diagram is shown in FIG. 5.

FIG. 6 shows the block diagram of a first embodiment of a measurement system whose block diagram is shown in FIG. 5. The system represented in FIG. 6 comprises a transducer 81 mounted on an object which is subjected to vibrations (this object is not shown in FIG. 6), and an electronic circuit 83 for the processing of the output signal supplied by the transducer 81.

The transducer 81 is arranged as a velocimeter and supplies an electric voltage as an output signal, this voltage being proportional to the vibration velocity of the object over the entire interesting frequency range.

The transducer 81 is followed by an amplification step 82 which may contain correction elements or not.

The amplifier 82 is followed by two branches 83, 84 for the processing of its output signal which represents the vibration velocity of the object.

The branch 83 comprises an integrator 85 that transforms the signal supplied at the output of the amplifier 82, corresponding to the velocity of the vibration, into a signal which corresponds to the vibration displacement. The integrator 85 is followed by an adjustable gain amplifier 86, followed in turn by a low-pass filter 87 whose passing band extends from $f_0$ to $f_1$.

The branch 84 contains an adjustable gain amplifier 88 followed by a high-pass filter 89 whose passing band extends from $f_1$ to $f_2$.

The adjustable gain amplifiers 86 and 88 allow to control the two sensibilities, namely that of the vibration displacement and of the vibration velocity.

The output signals of the two branches 83 and 84 are added by means of a summing integrator 90 that supplies an output signal $E_s$ whose mathematical expression is the following:

$E_s = x$ in the interval $[f_0; f_1]$ $E_s = dx/dt = x'$ in the interval $[f_1; f_2]$ thus:

$E_s = (x[f_0; f_1]) \oplus (x'[f_1; f_2])$

The variable x represents the vibration displacement.

Second Example of a System According to FIG. 5

Figure 7:
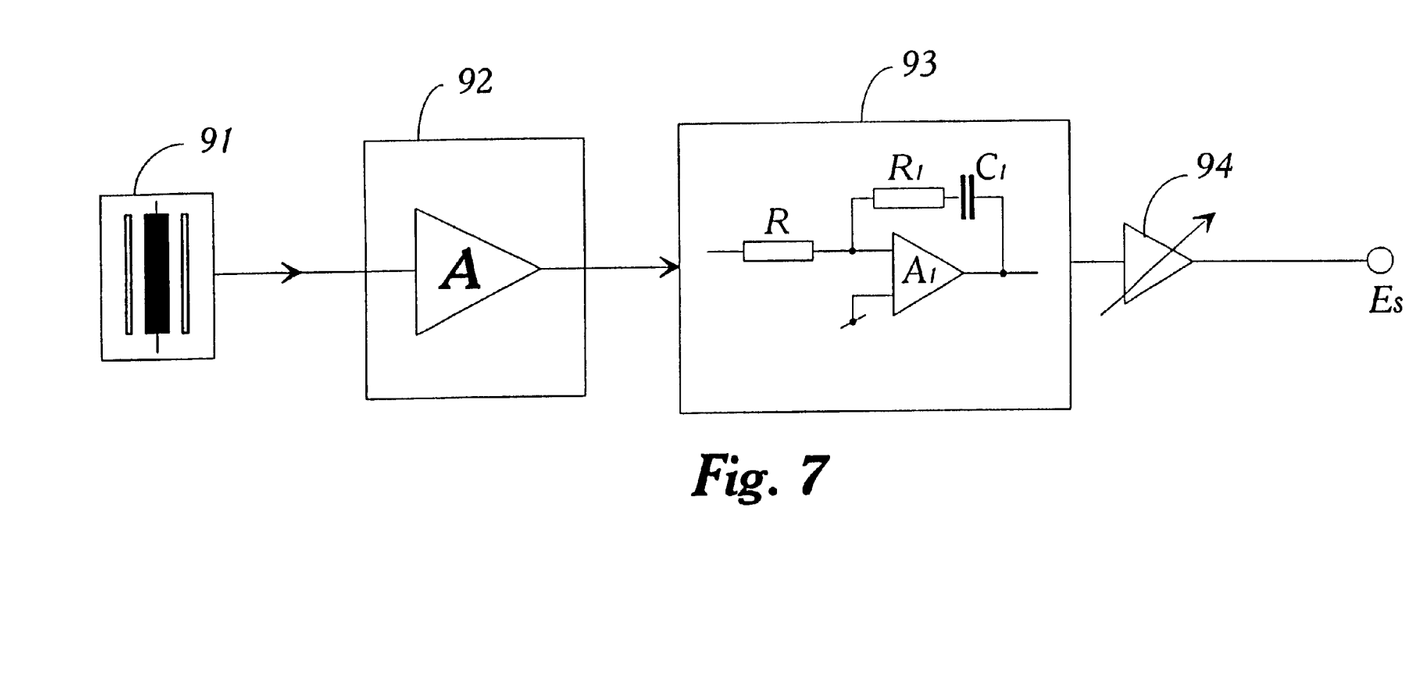
FIG. 7 shows a block diagram of a second embodiment of a system whose block diagram is shown in FIG. 5.

FIG. 7 shows the block diagram of a second embodiment of a measurement system whose block diagram is shown in FIG. 5. The system represented in FIG. 7 comprises a transducer 91 mounted on an object which is subjected to vibrations (this object is not shown in FIG. 7), and an electronic circuit for the processing of the output signal supplied by the transducer 91.

The transducer 91 is arranged as a velocimeter and supplies an electric voltage as an output signal, this voltage being proportional to the vibration velocity of the object over the entire interesting frequency range.

The transducer 91 is followed by an amplifier 92 having a dynamic that is adapted to the entire range of useful frequencies. The amplifier 92 is followed by a circuit 93 for the processing of its output signal. The circuit 93 is in turn followed by an adjustable gain amplifier 94.

The circuit 93 is a limited I/P integrator having the structure shown in FIG. 7. In the circuit 93, the output signal supplied by the amplifier 92 is subjected, as to the electronic meaning, to a so-called "limited" I/P integration. The term "limited" integration is justified by the fact that the I/P circuit acts as a mathematical integrator in the range of low frequencies until the so-called transition frequency $f_1$, in which field the impedance of the feedback of the amplifier that is part of the I/P integrator, is essentially capacitive and becomes resistive for the range of high frequencies. The transition frequency $f_1$ responds to the relation $$f_1 = 1/2\pi R_1 C_1.$$

The output signal supplied by the circuit 93 is amplified in the adjustable gain amplifier 94.

The adjustable gain amplifier 94 supplies an output signal Es whose mathematical expression is the same as that in the foregoing Example, described with regard to FIG. 6:

$$E_s = x \text{ in the interval } [f_0; f_1]$$

$$E_s = dx/dt = x' \text{ in the interval } [f_1; f_2]$$

thus:

$$E_s = (x[f_0; f_1]) \oplus (x'[f_1; f_2])$$

The variable x represents the vibration displacement.

In the present Example, the output signal $E_s$ fulfills the function $$E_s = (x[f_0; f_1]) \oplus (x'[f_1; f_2])$$

precisely at the asymptotes, namely near the frequencies $f_0$ and $f_2$ and with a certain error around the transition frequency $f_1$.

General Remarks Regarding the Structure of a System According to the Invention Within the scope of the invention, no limitation whatsoever is requested regarding the choice of the type of the transducer to be used. The above-mentioned transducers are to be regarded as examples only. Other transducers may still be cited, such as piezoelectric accelerometers with integrated electronic supplying a voltage modulated output signal, piezoelectric accelerometers with integrated electronic supplying a current modulated output signal, piezoresistive accelerometers supplying a voltage output signal, etc. All these types of transducers may be used indifferently with the electronic circuits shown in FIGS: 3 and 4. Optical velocimeters may be used with the circuits represented in FIGS. 6 and 7.

The electronic circuit which processes the signal supplied by the transducer may be incorporated into the transducer casing or arranged outside. In the first case, the device is a transducer with integrated electronic where the output port 12 and the connector 14 in FIG. 1 are physically identical. In the second case, the outside electronic is mounted in a conditioning cabinet disposed distantly from the pickup or the transducer.

For sake of simplification of this description, the following components have not been represented in the block diagrams shown by the attached drawings; these components are however necessary, and their use are well known to the one skilled in the art:

a high-pass filter for attenuate the very low frequencies is mounted upstream those parts of the circuit which carry out mathematical integration operations;

a low-pass filter is also used for the rejection of high frequencies or undesired parasites.

In each one of the above circuits described with reference to the figures, the output signal $E_s$ can be transmitted as an electric voltage or through a voltage-to-current converter, or even in any other transmission form (optical, amplitude modulated radiofrequency, frequency modulated radiofrequency, etc.).

Frequency Response Curve of a Measurement System According to the Invention

Figure 8:
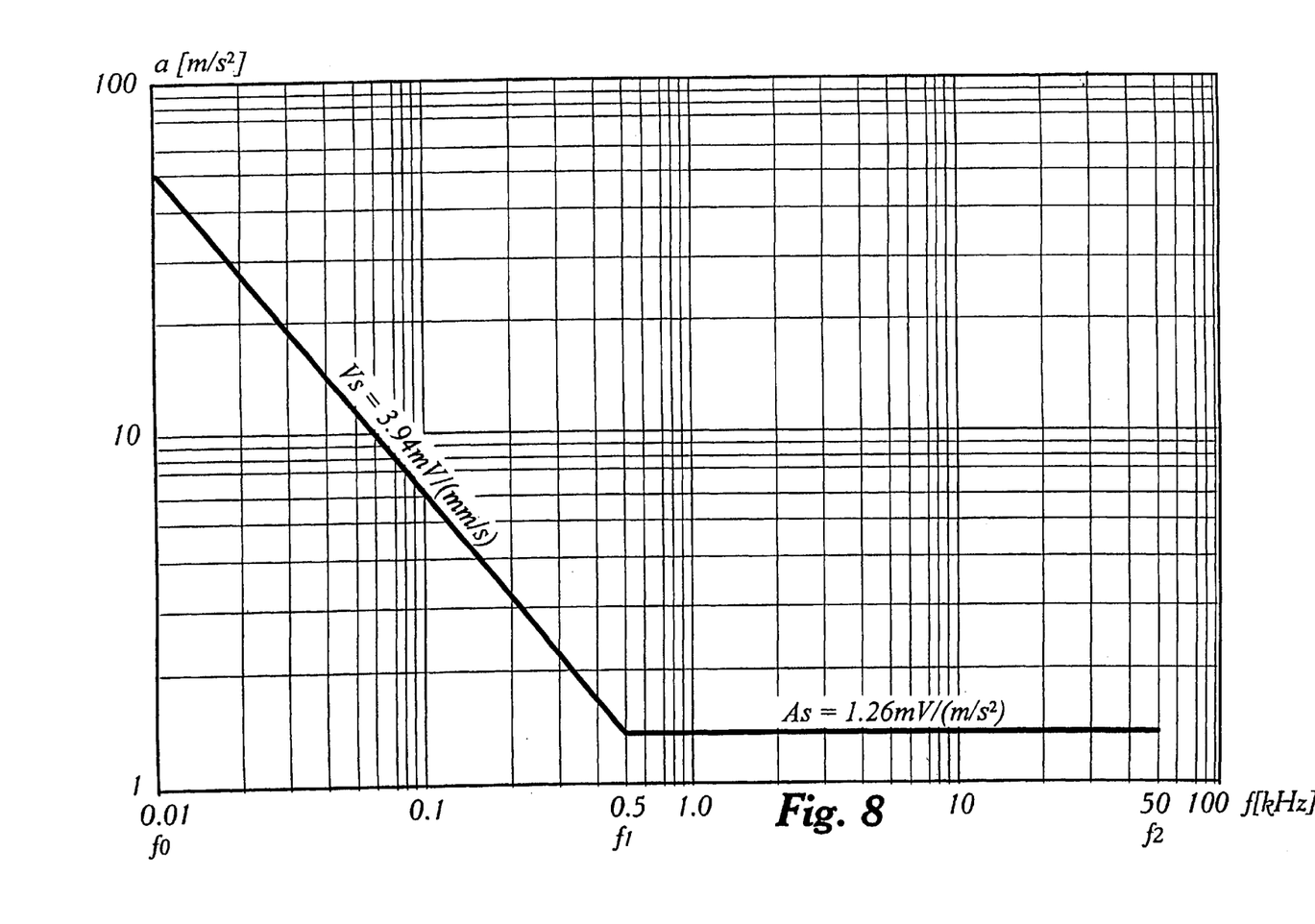
FIG. 8 shows the typical frequency response curve of a system according to the invention.

FIG. 8 shows an example of a frequency response curve of a system according to the invention, drafted on a log-log scale, the frequency being expressed in kHz on the abscissa and the acceleration in m/s$^2$ on the ordinate. This curve gives the transfer function between a vibration excitation signal of an acceleration at a constant level of 1 m/s$^2$ over the entire interesting frequency band (from 10 Hz to 50 kHz), and the output signal of the measurement system in said interesting frequency band.

The sensitivity of the measurement chain in this Example is $A_s$=1.26 mV/(m/s$^2$), representative of the acceleration of the vibration movement within the frequency band of from $f_1$=500 Hz to $f_2$=50 kHz, and $V_s$=3.94 mV/(mm/s), representative of the vibration velocity within the frequency band of from $f_0$=10 Hz to $f_1$=500 Hz. The frequency response curve according to FIG. 8 shows two branches:

the low frequency branch represents the mathematical integration $$v(t) = \int a(t) dt$$

$$V(f) = \frac{a(f)}{2 \cdot \pi \cdot f}$$

or $$\delta(t) = \int v(t) dt$$

$$\delta(f) = \frac{V(f)}{2 \cdot \pi \cdot f}$$

wherein:

δ or x are the vibration displacement, v or $\dot{x}$ are the vibration velocity, and a or $\ddot{x}$ are the vibration acceleration, the curve having a slope of −6 dB/octave; and the medium and high frequency branch represents a constant sensitivity.

In the example of representation of the frequency response curve shown by FIG. 8, the limits at very low frequencies (frequencies lower than $f_0$) given by the high-pass filter has been excluded. The high-pass filter is necessary before the operation of the mathematical integration. The limit at very high frequencies (higher than $f_2$) has been excluded as well. It is given by a low-pass filter, the role of which is to eliminate undesired signals or parasites.

The two branches converge at a so-called transition frequency $f_1$. If the continuity of the curve in $f_1$ should be respected, the velocity sensitivity $V_s$ and the acceleration sensitivity $A_s$ follow the relation: $A_s = (1/(2\pi f_1))V_s$, and the sensitivities of the displacement $D_s$ and of the velocity $V_s$ follow the same relation: $V_s = (1/(2\pi f_1))D_s$.

In the Example of the representation of the frequency response curve in FIG. 8, the transition frequency is $f_1$=500

Hz, the lower limit of the so-called low frequency band is $f_0=10$ Hz, and the upper limit of the so-called high frequency band is $f_2=50$ kHz.

Although preferred embodiments of the invention have been described using specific terms, such description is for illustrative purposes only, and it is to be understood that changes and variations may be made without departing from the spirit or scope of the invention defined by the following claims.

What is claimed is:

1. A method for measuring the mechanical vibrations of an object, comprising the steps of:

electronically processing an input signal, representative of an acceleration related to a mechanical vibration of said object and having a frequency spectrum comprising a low-frequency band situated below a transition frequency and a high-frequency band situated above said transition frequency, said processing being carried out by an electronic circuit which is adapted to provide an output signal which within said low-frequency band corresponds to the mathematical integral over the time of said input signal, and thereby to the vibration velocity of said object, and within said high-frequency band corresponds to the input signal, and thereby to the vibration acceleration of said object.

2. The method of claim 1, wherein said electronic circuit comprises two branches:

a first branch containing the connection in series of a charge divider, a charge amplifier, an integrator and a low-pass filter, said first branch having a first output, and a second branch containing the connection in series of a charge divider, a charge amplifier, and a high-pass filter, said second branch having a second output, the first and second outputs being connected respectively to corresponding input ports of a summing device.

3. The method of claim 1, wherein said electronic circuit comprises a conditioner for the signal supplied by the transducer, said conditioner being followed by two branches:

a first branch containing the connection in series of an integrator, an adjustable gain amplifier and a low-pass filter, said first branch having a first output, and a second branch containing the connection in series of an adjustable gain amplifier and a high-pass filter, said second branch having a second output, the first and second outputs being connected respectively to corresponding input ports of a summing device.

4. The method of claim 1, wherein the electronic circuit comprises a conditioner for the signal supplied by the transducer, said conditioner being followed by a connection in series of a limited integrator and an adjustable gain amplifier.

5. The method according to claim 1, wherein said object is an object subjected to vibrations, and in particular a rotating machine or a rotating piece connected to such a machine.

6. A method for measuring the mechanical vibrations of an object, comprising the steps of:

electronically processing an input signal, representative of a velocity related to a mechanical vibration of said object and having a frequency spectrum comprising a low-frequency band situated below a transition frequency and a high-frequency band situated above said transition frequency, said processing being carried out by an electronic circuit which is adapted to provide an output signal which within said low-frequency band corresponds to the mathematical integral over the time of said input signal, and thereby to the vibration displacement of said object, and within said high-frequency band corresponds to the input signal, and thereby to the vibration velocity of said object.

7. The method of claim 6, wherein said electronic circuit comprises a conditioner for the signal supplied by the transducer, said conditioner being followed by two branches:

a first branch containing the connection in series of an integrator, an adjustable gain amplifier and a low-pass filter, said first branch having a first output, and a second branch containing the connection in series of an adjustable gain amplifier and a high-pass filter, said second branch having a second output, the first and second outputs being connected respectively to corresponding input ports of a summing device.

8. The method of claim 6, wherein the electronic circuit comprises a conditioner for the signal supplied by the transducer, said conditioner being followed by a connection in series of a limited integrator and an adjustable gain amplifier.

9. The method according to claim 6, wherein said object is an object subjected to vibrations, and in particular a rotating machine or a rotating piece connected to such a machine.

10. A system for measuring the mechanical vibrations of an object, comprising:

(a) a transducer mounted on said object and being capable of providing at an output port an output signal which is representative of an acceleration related to a mechanical vibration of said object, said output signal comprising a low-frequency band situated below a transition frequency and a high-frequency band situated above said transition frequency, (b) an electronic circuit having an input port, connected to the output port of said transducer, and an output port, said circuit being adapted to process said output signal of said transducer to yield an output signal which within said low-frequency band corresponds to the mathematical integral over the time of said input signal, and which within said high-frequency band corresponds to said input signal.

11. The system of claim 10, wherein said electronic circuit comprises two branches:

a first branch containing the connection in series of a charge divider, a charge amplifier, an integrator and a low-pass filter, said first branch having a first output, and a second branch containing the connection in series of a charge divider, a charge amplifier, and a high-pass filter, said second branch having a second output, the first and second outputs being connected respectively to corresponding input ports of a summing device.

12. The system of claim 10, wherein said electronic circuit comprises a conditioner for the signal supplied by the transducer, said conditioner being followed by two branches:

a first branch containing the connection in series of an integrator, an adjustable gain amplifier and a low-pass filter, said first branch having a first output, and a second branch containing the connection in series of an adjustable gain amplifier and a high-pass filter, said second branch having a second output, the first and second outputs being connected respectively to corresponding input ports of a summing device.

13. The system of claim 10, wherein the electronic circuit comprises a conditioner for the signal supplied by the transducer, said conditioner being followed by a connection in series of a limited integrator and an adjustable gain amplifier.

14. The system according to claim 10, wherein said object is an object subjected to vibrations, and in particular a rotating machine or a rotating piece connected to such a machine.

15. A system for measuring the mechanical vibrations of an object, comprising:

(a) a transducer mounted on said object and being capable of providing at an output port an output signal which is representative of a velocity related to a mechanical vibration of said object, said output signal comprising a low-frequency band situated below a transition frequency and a high-frequency band situated above said transition frequency, (b) an electronic circuit having an input port, connected to the output port of said transducer, and an output port, said circuit being adapted to process said output signal of said transducer to yield an output signal which within said low-frequency band corresponds to the mathematical integral over the time of said input signal, and which within said high-frequency band corresponds to said input signal.

16. The system of claim 15, wherein said electronic circuit comprises a conditioner for the signal supplied by the transducer, said conditioner being followed by two branches:

a first branch containing the connection in series of an integrator, an adjustable gain amplifier and a low-pass filter, said first branch having a first output, and a second branch containing the connection in series of an adjustable gain amplifier and a high-pass filter, said second branch having a second output, the first and second outputs being connected respectively to corresponding input ports of a summing device.

17. The system of claim 15, wherein the electronic circuit comprises a conditioner for the signal supplied by the transducer, said conditioner being followed by a connection in series of a limited integrator and an adjustable gain amplifier.

18. The system according to claim 15, wherein said object is an object subjected to vibrations and in particular a rotating machine or a rotating piece connected to such a machine.

* * * * *